United States Patent [19]
Ishizuka et al.

[11] Patent Number: 5,744,881
[45] Date of Patent: Apr. 28, 1998

[54] SPINDLE MOTOR, AND ITS ROTOR YOKE MANUFACTURING METHOD

[75] Inventors: Yutaka Ishizuka; Koichi Katakura, both of Nagano, Japan

[73] Assignee: Kabushiki Kaisha Sankyo Seiki Seisakusho, Nagano, Japan

[21] Appl. No.: 544,030

[22] Filed: Oct. 17, 1995

[30] Foreign Application Priority Data

Oct. 17, 1994 [JP] Japan .................. 6-250730

[51] Int. Cl.⁶ .................................................. H02K 7/00
[52] U.S. Cl. .................. 310/67 R; 310/156; 360/99.08; 360/99.09
[58] Field of Search .................. 310/67 R, 156; 360/99.08, 99.09, 99.12, 270

[56] References Cited

U.S. PATENT DOCUMENTS

| | | | |
|---|---|---|---|
| 4,259,603 | 3/1981 | Uchiyama et al. | 310/68 B |
| 5,057,725 | 10/1991 | Kasai et al. | 310/51 |
| 5,128,819 | 7/1992 | Elsaesser et al. | 360/99.08 |
| 5,227,686 | 7/1993 | Ogawa | 310/90 |
| 5,252,871 | 10/1993 | Inoue | 310/90 |
| 5,402,023 | 3/1995 | Nakanishi et al. | 310/90 |
| 5,414,575 | 5/1995 | Katakura | 360/98.08 |
| 5,446,610 | 8/1995 | Elsaesser et al. | 360/99.08 |
| 5,457,588 | 10/1995 | Hattori et al. | 360/99.08 |

Primary Examiner—Steven L. Stephan
Assistant Examiner—Timothy A. Williams
Attorney, Agent, or Firm—Sughrue, Mion, Zinn, Macpeak & Seas, PLLC

[57] ABSTRACT

A drive magnet unit is fixedly mounted on the inner cylindrical surface of the cylindrical portion of a rotor yoke which is fixedly mounted on a hub, in such a manner that the drive magnet unit confronts a stator core. The rotor yoke has an annular portion along its open end. The rotor yoke has a curved portion along the open end which forms a gap with the outer cylindrical surface of the drive magnet unit. The annular portion is sheared along its base, thus forming a shear plane. The inner surface of the bottom of the rotor yoke, and the inner cylindrical surface of the cylindrical portion of the rotor yoke form a right-angled portion with which the right-angled outer edge portion of the drive magnet unit is engaged. The peripheral surface of the right-angled portion defines a through-hole in the bottom which is engaged with the hub. The gap is filled with adhesive, to fixedly secure the drive magnet unit to the rotor yoke.

12 Claims, 5 Drawing Sheets

SPINDLE MOTOR, AND ITS ROTOR YOKE MANUFACTURING METHOD

BACKGROUND OF THE INVENTION

1. Field of the Invention

This invention relates to a spindle motor employed, for instance, in a magnetic disk driving unit, and a method of manufacturing its rotor yoke.

2. Related Art

FIG. 6 is a sectional view of a conventional spindle motor which has been disclosed by Unexamined Japanese Patent Application No. 49223/1993. The spindle motor comprises: a rotor frame 1 which is rotated with a disk (not shown) mounted on it; a cylindrical rotor yoke 2 of magnetic material which is fixedly mounted on the outer peripheral portion of the lower end face of the rotor frame 1; a drive magnet unit 3 fixedly mounted on the inner cylindrical surface of the rotor yoke 2; and a stator core 4 which is arranged confronted with the drive magnet unit 3. The rotor frame 1 is rotatably supported by bearings 7 and 7' which are held on a stator frame 18. When current is applied to a coil assembly 5 wound on the stator core 4, an electromagnetic action occurs between the stator core 4 and the drive magnet unit 3, to cause the drive magnet unit 3, the rotor frame 1, and the disk to rotate as one unit. In the conventional spindle motor, the stator core 4 and the coil assembly 5 form a stator.

The above-described conventional rotor yoke 2 is manufactured by a method shown in the parts (A) and (B) of FIG. 7. First, a bottomed cylinder is formed by drawing a magnetic plate such as a cold-rolled steel plate with a die 30 and a punch 31, in such a manner that the axial length L1 of the bottomed cylinder is larger than the aimed length L2, because it is difficult to obtain the aimed length L2 by only one plate-drawing operation. In other words, the bottomed cylinder formed by drawing is variable in dimension; that is, its axial length is not always equal to the aimed value L2. In order to overcome this difficulty, first the bottomed cylinder whose axial length L1 is larger than the aimed value L2, is formed, and then the cylinder is cut to the aimed length L2.

Hence, the cylinder is radially cut (or trimmed) with a cutting tool 6 so that the height of the rotor yoke 2 is the aimed dimension L2. For this purpose, the following method is employed: As shown in the part (B) of FIG. 7, the workpiece, namely, the rotor yoke 2 formed by drawing is sheared with the cutting tool 6 while being turned; or the rotor yoke is fixedly held and cut with a rotary saw.

The rotor yoke 2 thus formed suffers from the following problems: The workpiece or the cutting tool is turned to cut the bottomed cylinder. Hence, when the bottomed cylinder is cut; that is, when its open end portion 2b is cut off, rough burs are formed on the cut end 2c (see FIG. 8A). The burs thus formed are liable to drop, thus greatly lowering the reliability of a device to which the motor is applied. Furthermore, as shown in the part (A) of FIG. 8, burs 2d are formed along the inner periphery of the cut end 2c in such a manner that they are extended radially inwardly. The burs give rise to problems when the drive magnet unit 3 is inserted into the rotor yoke 2. That is, when inserted into the rotor yoke, the drive magnet unit 3 removes the burrs 2d, thus forming magnetic splinters; and the burs themselves obstruct the insertion of the drive magnet unit 3 into the rotor yoke.

As shown in the part (B) of FIG. 8, the drive magnet unit 3 is fixedly secured to the rotor yoke 2 with adhesive 7 applied to the open end 2c of the latter 2. Hence, the above-described aimed dimension L2 must be determined with a marginal dimension L3 taken into account which is to hold the adhesive 7 thereby to obtain great adhesive strength. Therefore, in the case where a rotor yoke 2 of this type is applied to a spindle motor which has a stator frame 8' as indicated by the chain lines in FIG. 6, the height of the motor is increased by as much as the marginal dimension L3, which obstructs the reduction in thickness of the motor.

SUMMARY OF THE INVENTION

In view of the foregoing, an object of the invention is to provide a spindle motor in which its rotor yoke is improved in configuration and in its manufacturing method so that the formation of burrs is eliminated when it is manufactured, and the drive magnet unit can be inserted into the rotor yoke with ease.

Another object of the invention is to provide a spindle motor in which the motor body is decreased in thickness, and the drive magnet unit is prevented from damage, and its rotor yoke manufacturing method is improved.

According to an aspect of the present invention, there is provided spindle motor comprising a rotor frame adapted to rotate a disk mounted thereon, a rotor yoke of magnetic material which is secured to said rotor frame, a drive magnet unit fixedly mounted on the inner cylindrical surface of said rotor yoke; and a stator arranged confronted with said drive magnet unit, wherein said rotor yoke includes: a cylindrical portion on the inner cylindrical surface of which said drive magnet unit is fixedly mounted, an annular portion which is radially outwardly extended from the edge of the open end of said cylindrical portion, a shear plane which is formed on the outer peripheral surface of said annular portion; and a curved portion formed along the inner peripheral edge of the open end of said cylindrical portion.

The spindle motor of the invention is constructed as described above. Therefore, no burrs are formed along the opening of the rotor yoke. Furthermore, since the rotor yoke has the curved portion which is formed along the inner peripheral edge of the open end of the rotor yoke, the drive magnet unit can be readily inserted into the rotor yoke, which eliminates the difficulty accompanying the conventional rotor yoke that the drive magnet unit is scraped by the rotor yoke when inserted into the latter, thus forming magnetic splinters.

The annular portion of the rotor yoke is axially sheared along its base. Hence, no rough bars are formed on the shear plane. This feature contributes to an improvement in reliability of a device to which the spindle motor is applied.

In addition, the gap formed between the drive magnet unit and the curved portion formed along the inner peripheral edge of the open end of the rotor yoke, is filled with adhesive. That is, the region to which the adhesive is applied, is not protruded outside, which contributes to a miniaturization of the spindle motor. The gap between the drive magnet unit and the curved portion holds the adhesive sufficiently, and therefore, the drive magnet unit is positively secured to the rotor yoke.

The rotor yoke of the invention has the through-hole in the bottom at a center which is made up of the first hole, and a second hole which is smaller in diameter than the first hole. The rotor yoke is engaged with the rotor frame through the inner cylindrical surface of the second hole. Hence, for instance, by caulking the peripheral portion of the second hole, the rotor yoke can be connected to the rotor frame; that is, the junction of the rotor yoke and the rotor frame will never be brought into contact with the drive magnet unit, thus not affecting the position of the drive magnet unit, and contributing to miniaturization of the rotor.

BRIEF DESCRIPTION OF THE DRAWING(S)

FIG. 2 (B) is a sectional diagram showing a hat-shaped product formed by drawing the magnetic plate; and FIG. 2 (C) is a sectional view showing a step of shearing the annular portion of the hat-shaped product.

FIG. 3 (B) is a sectional view showing a drive magnet unit engaged with the rotor yoke;

FIG. 7 (B) is a sectional diagram showing a step of cutting the cylindrical product thus formed.

FIG. 8 (B) is a sectional view showing the rotor yoke with a drive magnet unit.

DETAILED DESCRIPTION OF THE PREFERRED EMBODIMENTS

A spindle motor, which is an embodiment of the invention, will be described with reference to FIGS. 1 through 5.

Figure 1:
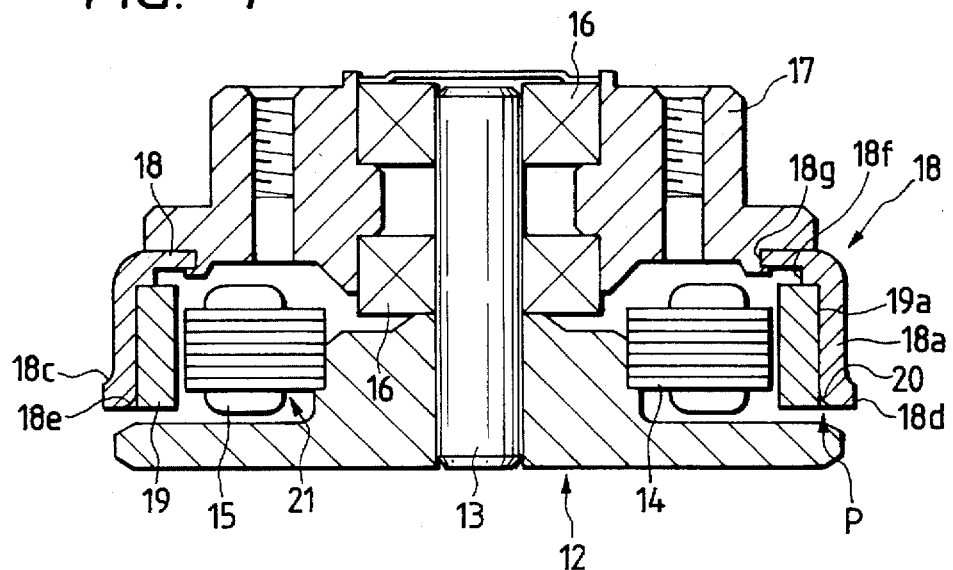
FIG. 1 is a vertical sectional diagram showing a spindle motor, which constitutes an embodiment of the invention.

In FIG. 1, reference numeral 12 designates a stator frame which is mounted on the chassis of a device to which the motor is applied. The stator frame 12 has a stationary shaft 13 at the center. Bearings 16 are mounted on the stationary shaft 13, to rotatably support a rotor frame 17. A rotor yoke 18 is fixedly mounted on the lower surface of the outer peripheral portion of the rotor frame 17. A drive magnet unit 19 is fixedly mounted on the inner cylindrical surface of the cylindrical portion 18a of the rotor yoke 18. The aforementioned stator frame 12 fixedly supports a stator core 14 which has a plurality of poles which are radially protruded in such a manner that they are confronted through a predetermined gap with the inner cylindrical surface of the drive magnet unit 19. A coil assembly 15 is wound on those protruded poles of the stator core 14. In the embodiment, the stator core 14 and the coil assembly 15 form a stator 21.

When current is applied to the coil assembly 15, an electromagnetic action occurs between the stator core 14 and the drive magnet unit 19, to rotate rotary members, namely, the drive magnetic unit 19, the rotor yoke 18, the rotor frame 17 and the disk (not shown) which is mounted on the latter 17.

Now, the configuration of the rotor yoke 18, and a method of manufacturing the latter 18, will be described.

Figure 2A:
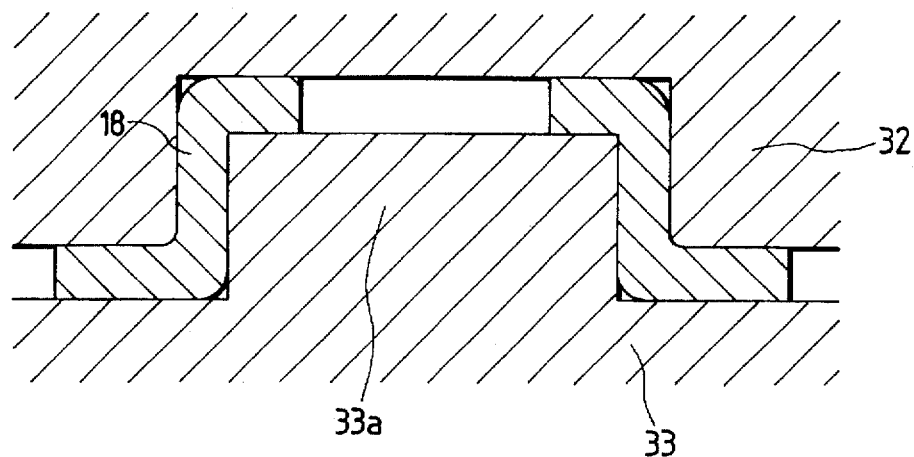
FIG. 2 shows steps of manufacturing a rotor yoke for the spindle motor shown in FIG. 1. More specifically, the part (A) of FIG. 2 is a sectional diagram showing a step of drawing a magnetic plate of a rotor yoke for spindle motor as shown in FIG. 1.
Figure 2B:
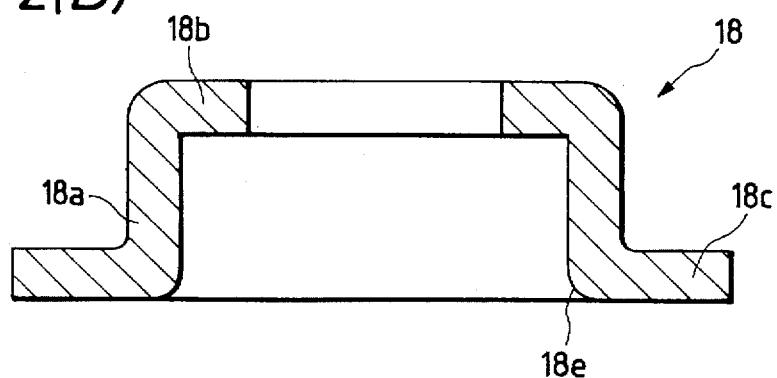
Figure 2C:
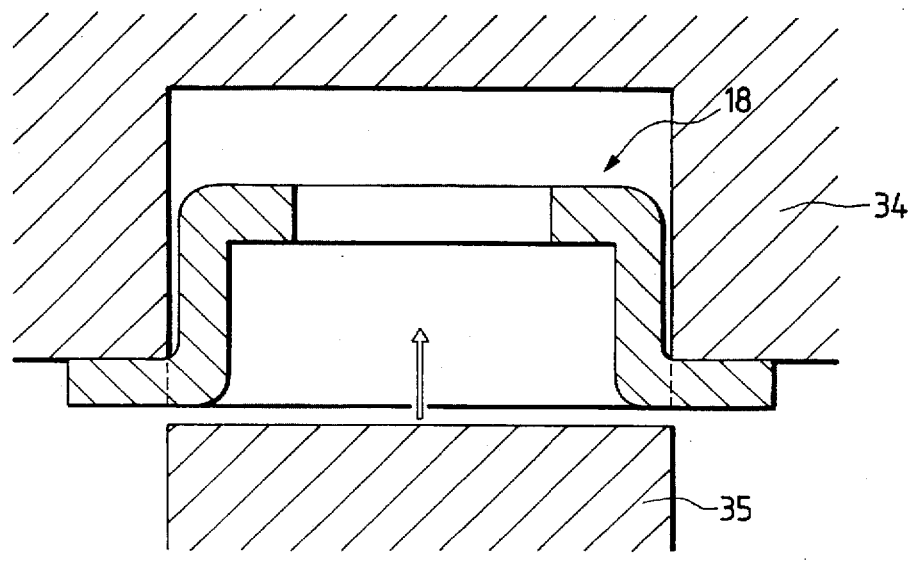

The rotor yoke 18 is formed as follows: First, a hat-shaped product, as shown in the part (A) of FIG. 2, is formed by drawing a magnetic plate such as a cold-rolled steel plate with a die 32, and a punch 33 having a protrusion 33a the radius of which is smaller than that of the die by as much as the thickness of the magnetic plate. The hat-shaped product thus formed is as shown in the part (B) of FIG. 2. That is, the hat-shaped product is made up of a cylindrical portion, and an annular portion (corresponding to the brim of the hat) extended from the edge of the opening of the cylindrical portion. The annular portion 18c has its inner circular edge curved as indicated at 18e (hereinafter referred to as "a curved portion 18e", when applicable).

Next, as shown in the part (C) of FIG. 2, a die 34, and a punch 35 the diameter of which is equal to the inside diameter of the die 34 are used to axially shear the annular portion to obtain a diameter slightly larger than the outer diameter of the cylindrical portion. In this cutting operation, the above-described conventional method is not employed in which the rotor yoke or the cutting tool is turned. Hence, no rough burrs are formed on the shear plane. The inside diameter of the die 34 is slightly larger than the outside diameter of the rotor yoke 18. Therefore, when the annular portion is sheared in the above-described manner, a flange 18c is formed around the opening of the cylindrical portion. Thus, the aimed rotor yoke 18 has been formed.

Figure 3A:
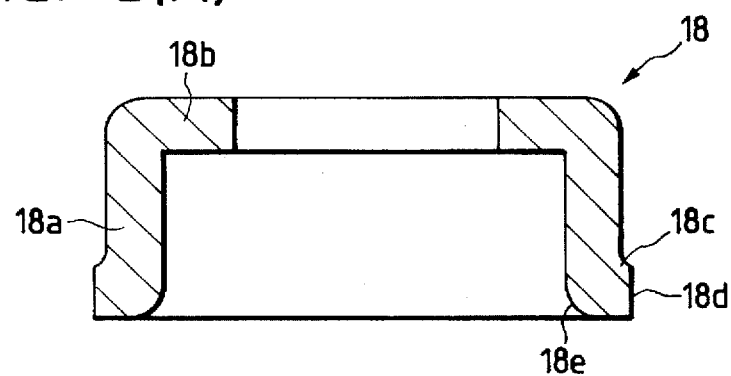
FIG. 3 (A) is a sectional view of the rotor yoke.
Figure 3B:
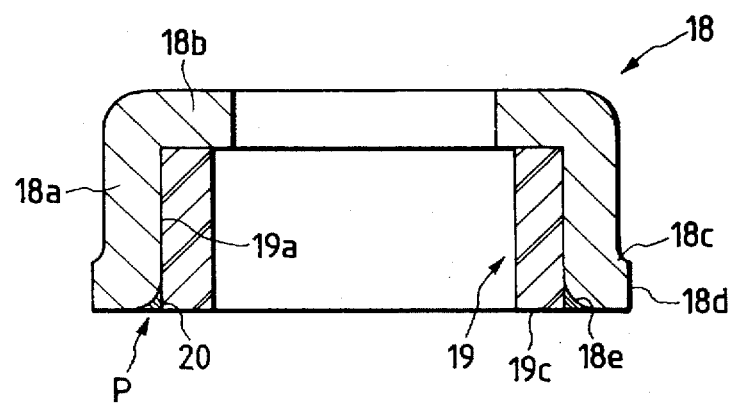

The rotor yoke 18 thus formed is as shown in the part (A) of FIG. 3. That is, the rotor yoke 18 is made up of the aforementioned cylindrical portion 18a, a bottom 18b, the aforementioned flange 18c formed around the opening of the cylindrical portion 18a, a shear plane 18d which is the outer cylindrical surface of the flange, and the aforementioned curved portion 18e which is formed along the inner periphery of the open end of the cylindrical portion 18a. That is, in the rotor yoke of the invention, unlike the conventional one, the curved portion 18e is formed along the opening of the cylindrical portion 18a, and no burrs are formed which are radially inwardly extended.

The drive magnet unit 19 is inserted into the rotor yoke 18 as shown in the part (B) of FIG. 3. As was described above, the rotor yoke has the curved portion 18e formed along the inner peripheral edge of the open end of the cylindrical portion 18a. Hence, when the drive magnet unit 19 is fitted in the rotor yoke 18, then a gap P is formed between the outer cylindrical surface 19a of the drive magnet unit 19 and the curved portion 18e of the rotor yoke 18. The gap P is filled with adhesive 20 so that the drive magnet unit 19 is positively secured to the rotor yoke 18. Furthermore, when the drive magnet unit 19 is inserted into the rotor yoke 18, the curved portion 18e serves as a guide, so that the insertion of the drive magnet unit 19 into the rotor yoke 18 can be achieved with ease. In addition, the rotor yoke 18, unlike the conventional one, has no burrs which are radially inwardly extended. Accordingly, when the drive magnet unit 19 is inserted into the rotor yoke 18, it is unnecessary to machine the drive magnet unit 19. Since the adhesive 20 is held in the gap P between the drive magnet unit 19 and the curved portion 18e of the rotary yoke 18, it is unnecessary to set the axial length of the rotor yoke 18 to the value which is determined with the application of the adhesive 20 taken into consideration; that is, the end face of the rotor yoke 18 which is on the side of the opening of the latter 18 may be made flush with the end face of the drive magnet unit 19, which makes it possible to reduce the thickness of the motor body.

Figure 4:
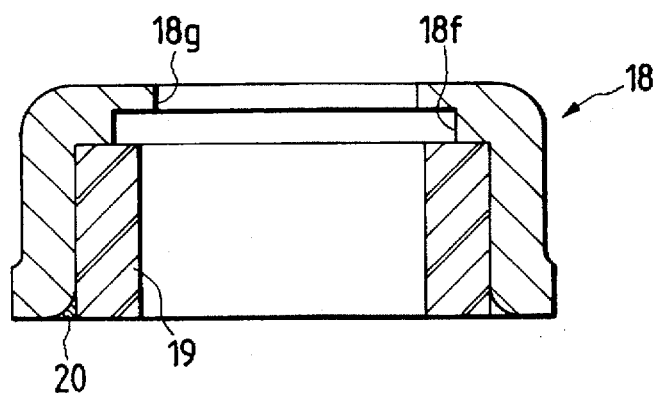
FIG. 4 is a sectional view showing a modification of the rotor yoke shown in FIG. 3.
Figure 5:
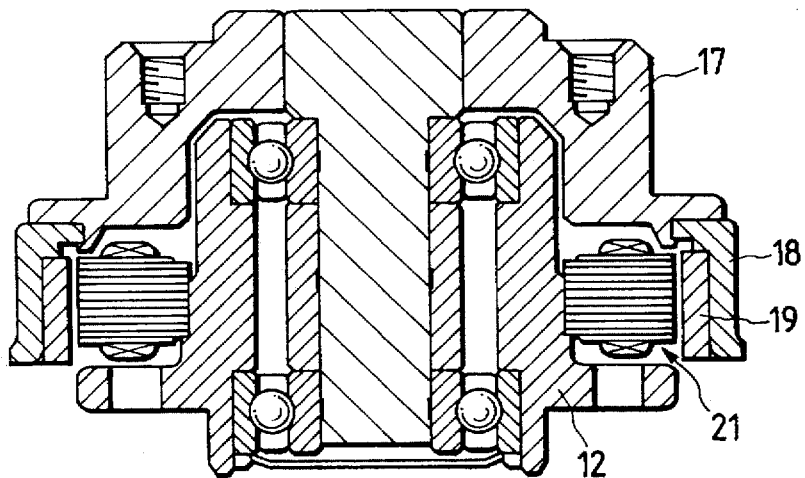
FIG. 5 is a vertical sectional view showing another spindle motor.
Figure 6:
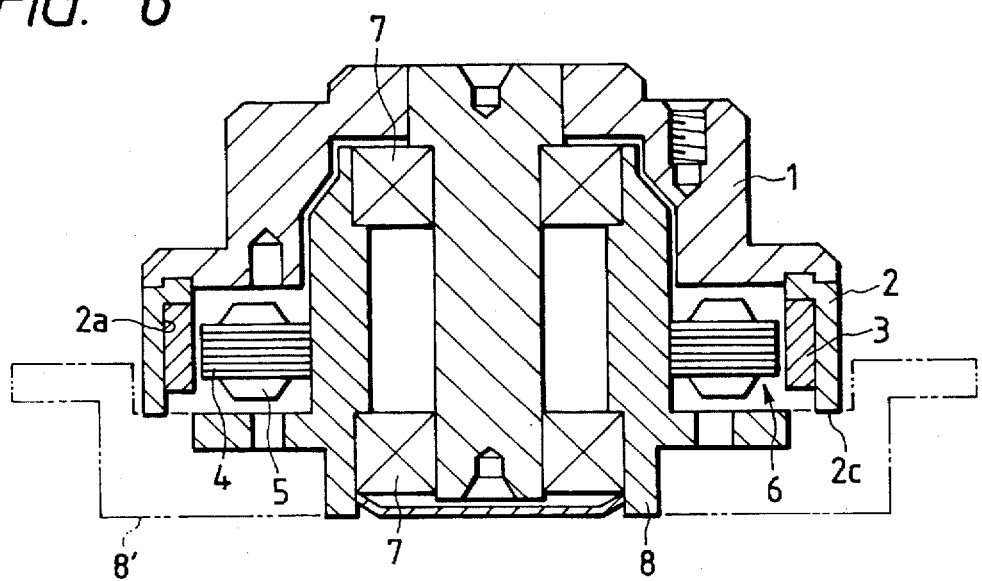
FIG. 6 is a vertical sectional view showing a conventional spindle motor.
Figure 7A:
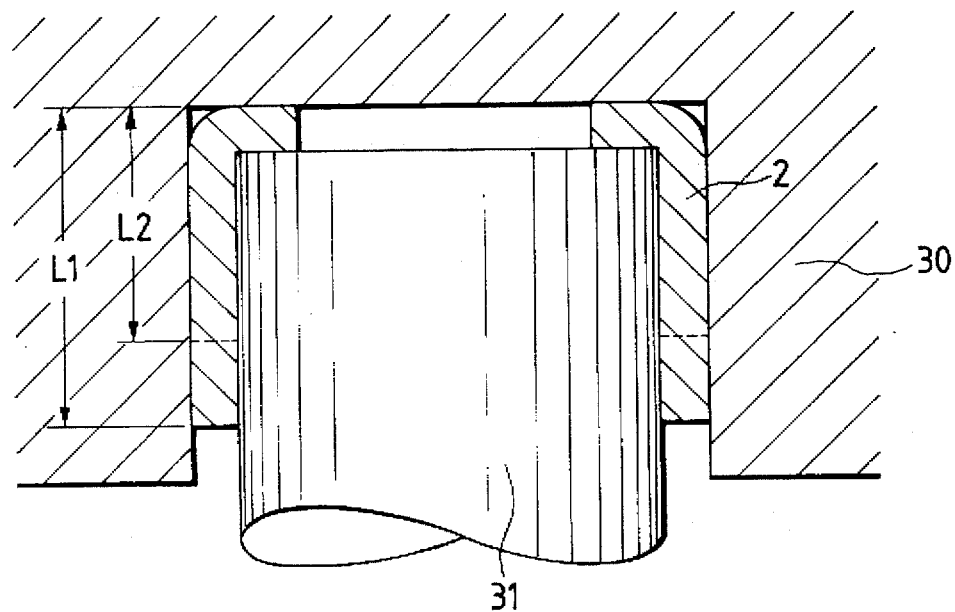
FIG. 7 (A) is a sectional diagram showing a step of drawing a magnetic plate to form a cylindrical product for the conventional spindle motor.
Figure 7B:
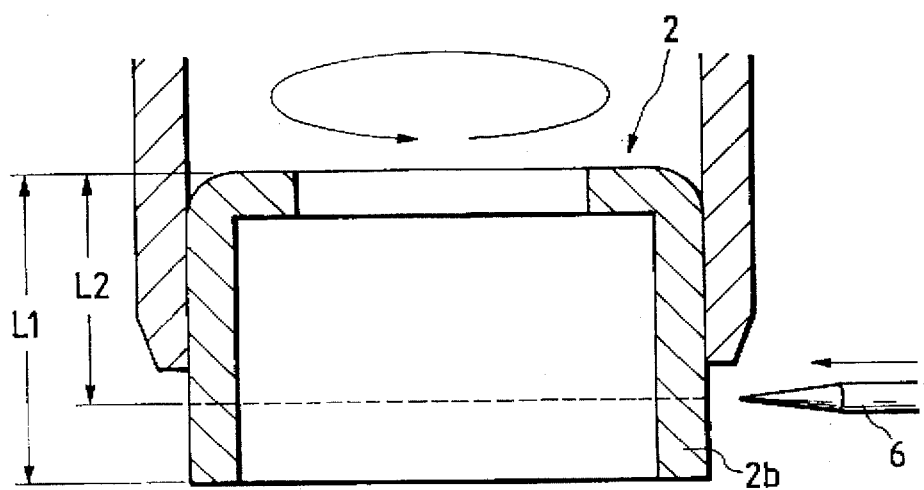
Figure 8A:
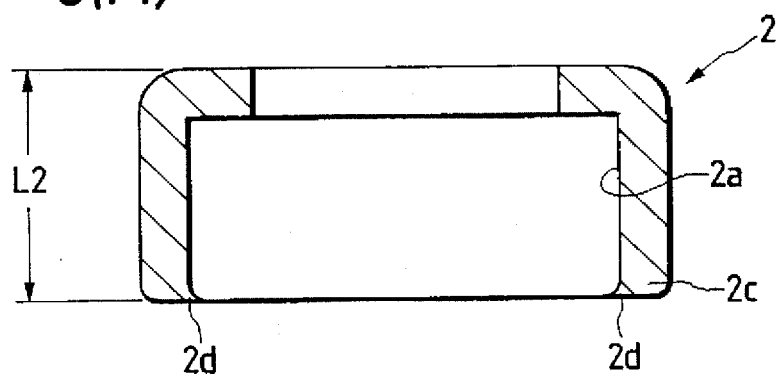
FIG. 8 (A) is a sectional view showing the rotor yoke of the conventional spindle motor.
Figure 8B:
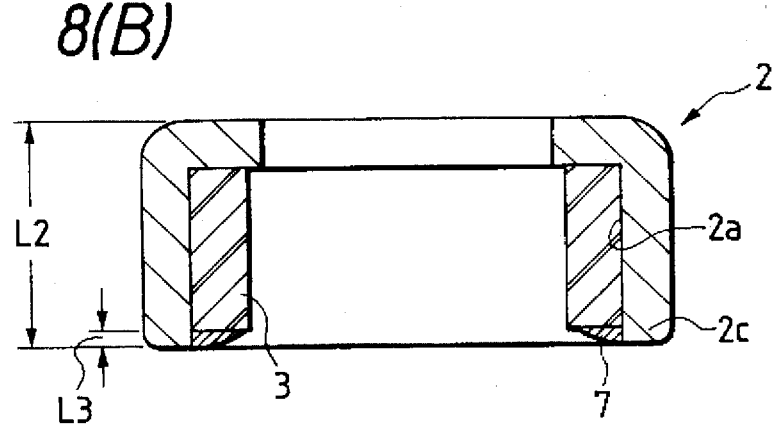

A modification of the above-described rotor yoke will be described with reference to FIG. 4. The rotor yoke, as shown in FIG. 4, has a stepped through-hole in the bottom 18b (see FIG. 3A) which is made up of a first hole 18f, and a second hole 18g which is smaller in diameter than the first hole 18f and is coaxial with the latter 18f. The stepped hole can be readily formed by modifying the protrusion 33a of the punch 33 shown in the part (A) of FIG. 2 in such a manner that it has another protrusion at the center which is different in diameter than the protrusion 33a.

The rotor yoke is engaged with the rotor frame 17 through the cylindrical wall of the second hole 18g. And the rotor yoke is fixedly connected to the rotor frame 17, for instance, by caulking the edge of cylindrical wall of the second hole 18g. In other words, the connection of the rotor yoke to the rotor frame is achieved by caulking the edge of the cylindrical wall of the second hole 18g which is set back from the first hole 18f, and therefore the junction of the rotor yoke and the rotor frame will never touch the drive magnet unit 19, thus not affecting the position of the drive magnet unit 19, and contributing to a reduction in thickness of the rotor.

While there has been described in connection with the preferred embodiment of the invention, it will be obvious to those skilled in the art that various changes and modifications may be made therein without departing from the invention. For instance, the above-described spindle motor, the embodiment of the invention, is of fixed-shaft type; however, the technical concept of the invention may be equally applied to a spindle motor of rotary-shaft type. Furthermore, in the above-described embodiment, the ball bearings 16 and 16 are used to rotatably support the rotor frame 17. However, instead of the ball bearings, dynamic bearings or sliding bearings may be employed.

The spindle motor of the invention is constructed as described above. Therefore, no burrs are formed along the opening of the rotor yoke. Furthermore, since the rotor yoke has the curved portion which is formed along the inner edge of the open end of the rotor yoke, the drive magnet unit can be readily inserted into the rotor yoke, which eliminates the difficulty accompanying the conventional rotor yoke that the drive magnet unit is scraped by the rotor yoke when inserted into the latter, thus forming magnetic splinters.

The annular portion of the rotor yoke is axially sheared along its base. Hence, no rough bars are formed on the shear plane. This feature contributes to an improvement in reliability of a device to which the spindle motor is applied.

In addition, the gap formed between the drive magnet unit and the curved portion which is formed along the inner peripheral edge of the open end of the rotor yoke, is filled with adhesive. That is, the region to which the adhesive is applied, is not protruded outside, which contributes to a miniaturization of the spindle motor. The gap between the drive magnet unit and the curved portion holds the adhesive sufficiently, and therefore the drive magnet unit is positively secured to the rotor yoke.

The rotor yoke of the invention has the through-hole in the bottom at the center which is made up of the first hole, and the second hole which is smaller in diameter than the first hole. The rotor yoke is engaged with the rotor frame through the inner cylindrical surface of the second hole. Hence, for instance, by caulking the peripheral portion of the second hole, the rotor yoke can be connected to the rotor frame; that is, the junction of the rotor yoke and the rotor frame will never be brought into contact with the drive magnet unit, thus not affecting the position of the drive magnet unit, and contributing to miniaturization of the rotor.

What is claimed is:

1. A spindle motor comprising:
    a rotor frame adapted to rotate a disk mounted thereon;
    a rotor yoke of magnetic material which is secured to said rotor frame;
    a drive magnet unit fixedly mounted on an inner cylindrical surface of said rotor yoke; and
    a stator arranged confronted with said drive magnet unit, wherein said rotor yoke includes:
        a cylindrical portion on the inner cylindrical surface of which said drive magnet unit is fixedly mounted;
        an annular portion which is radially outwardly extended from an edge of an open end of said cylindrical portion, wherein a thickness of said annular portion is greater than a thickness of said cylindrical portion;
        a shear plane which is formed in an axial direction on an outer peripheral surface of said annular portion; and
        a curved portion formed along an inner peripheral edge of the open end of said cylindrical portion.

2. A spindle motor as claimed in claim 1, in which a gap is provided between said curved portion formed along the inner peripheral edge of the open end of said cylindrical portion and an outer cylindrical surface of said drive magnet unit, and said gap is filled with adhesive.

3. A spindle motor as claimed in claim 1, in which said cylindrical portion of said rotor yoke has a bottom at one end, which has a first hole at the center, and a second hole which is smaller in diameter than said first hole, and has an inner cylindrical surface through which said second hole is engaged with said rotor frame.

4. A spindle motor as claimed in claim 2, in which said cylindrical portion of said rotor yoke has a bottom at one end, which has a first hole at the center, and a second hole which is smaller in diameter than said first hole, and has an inner cylindrical surface through which said second hole is engaged with said rotor frame.

5. A spindle motor comprising:
    a rotor frame adapted to rotate a disk mounted thereon;
    a rotor yoke of magnetic material which is secured to said rotor frame;
    a drive magnet unit fixedly mounted on an inner cylindrical surface of said rotor yoke; and
    a stator arranged confronted with said drive magnet unit, wherein said rotor yoke includes:
        a cylindrical portion on the inner cylindrical surface of which said drive magnet unit is fixedly mounted, said cylindrical portion having an upper end portion which is fixed to a lower end portion of said rotor frame, said cylindrical portion being positioned radially outwardly beyond an outer peripheral portion of said rotor frame;
        an annular portion which is radially outwardly extended from an edge of an open end of said cylindrical portion, wherein a thickness of said annular portion is greater than a thickness of said cylindrical portion;
        a shear plane which is formed in an axial direction on an outer peripheral surface of said annular portion; and
        a curved portion formed along an inner peripheral edge of the open end of said cylindrical portion.

6. A spindle motor comprising:
    a rotor frame adapted to rotate a disk mounted thereon;
    a rotor yoke of magnetic material which is secured to said rotor frame;

a drive magnet unit fixedly mounted on an inner cylindrical surface of said rotor yoke; and a stator arranged confronted with said drive magnet unit, wherein said rotor yoke includes:

a cylindrical portion on the inner cylindrical surface of which said drive magnet unit is fixedly mounted;

an annular portion which is radially outwardly extended from an edge of an open end of said cylindrical portion, wherein a thickness of said annular portion is greater than a thickness of said cylindrical portion;

a shear plane which is formed in an axial direction on an outer peripheral surface of said annular portion, said shear plane being positioned radially outwardly beyond an outer peripheral portion of said rotor frame; and a curved portion formed along an inner peripheral edge of the open end of said cylindrical portion.

7. A spindle motor as claimed in claim 5, in which a gap is provided between said curved portion formed along the inner peripheral edge of the open end of said cylindrical portion and the outer cylindrical surface of said drive magnet unit, and said gap is filled with adhesive.

8. A spindle motor as claimed in claim 6, in which a gap is provided between said curved portion formed along the inner peripheral edge of the open end of said cylindrical portion and the outer cylindrical surface of said drive magnet unit, and said gap is filled with adhesive.

9. A spindle motor as claimed in claim 5, in which said cylindrical portion of said rotor yoke has a bottom at one end, which has a first hole at the center, and a second hole which is smaller in diameter than said first hole, and has an inner cylindrical surface through which said second hole is engaged with said rotor frame.

10. A spindle motor as claimed in claim 6, in which said cylindrical portion of said rotor yoke has a bottom at one end, which has a first hole at the center, and a second hole which is smaller in diameter than said first hole, and has an inner cylindrical surface through which said second hole is engaged with said rotor frame.

11. A spindle motor as claimed in claim 7, in which said cylindrical portion of said rotor yoke has a bottom at one end, which has a first hole at the center, and a second hole which is smaller in diameter than said first hole, and has an inner cylindrical surface through which said second hole is engaged with said rotor frame.

12. A spindle motor as claimed in claim 8, in which said cylindrical portion of said rotor yoke has a bottom at one end, which has a first hole at the center, and a second hole which is smaller in diameter than said first hole, and has an inner cylindrical surface through which said second hole is engaged with said rotor frame.

* * * * *